UNITED STATES PATENT OFFICE.

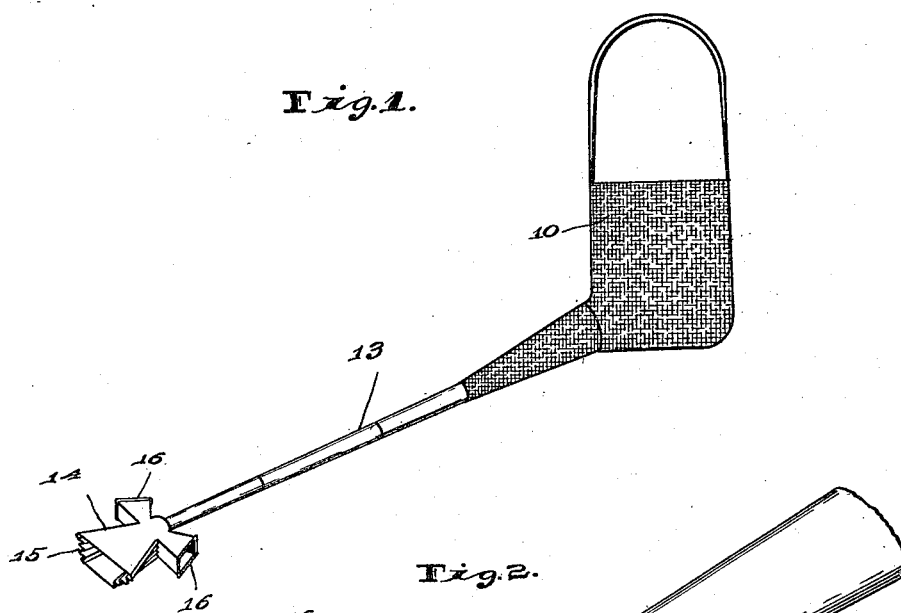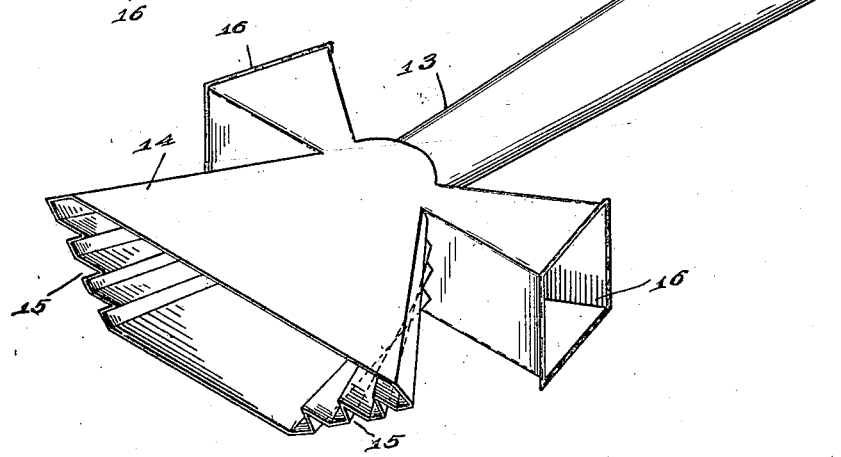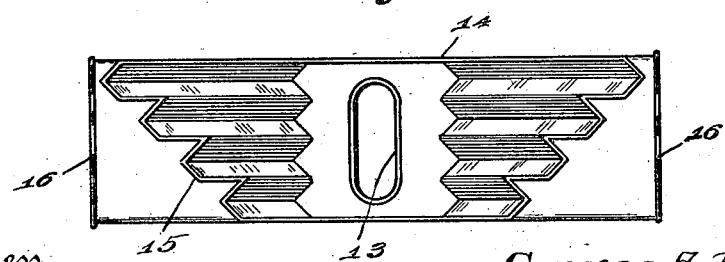

GEORGE A. WIRT, OF GREENSBURG, INDIANA.

BROADCAST SOWER.

1,274,969.  Specification of Letters Patent.  Patented Aug. 6, 1918.

Application filed April 27, 1918. Serial No. 231,192.

*To all whom it may concern:*

Be it known that I, GEORGE A. WIRT, a citizen of the United States, residing at Greensburg, in the county of Decatur and State of Indiana, have invented a new and useful Broadcast Sower, of which the following is a specification.

The object of my invention is to provide an improvement in that type of broadcast sowers described and claimed in my Patent No. 1,259,187, by means of which a better distribution of the seed may be obtained.

The accompanying drawings illustrate my invention. Figure 1 is a perspective view of my device in position for use; Fig. 2 a perspective view on a somewhat larger scale of the delivery end of the sower; and Fig. 3 an end elevation.

The device consists primarily of a hollow distributing head 14, into which seed is delivered through a hollow handle 13 from a supply sack 10, the hollow head 14 being wedge-shaped with its apex attached to the forward end of the handle 13, and laterally extending wind funnels 16 being arranged to deliver streams of air into the receiving end of the head 14 during the lateral swing of the head by the operator, so that the seed is separated and propelled in a thin stream having a vertical extent substantially equal to the height of the sides 15.

In the device of my patent, the sides 15 were substantially parallel and vertical and, therefore, in the absence of deflecting currents, the tendency of all the seeds in the vertical extent of the stream having a given velocity, was to fall upon the ground very closely together.

My present improvement involves a separation of the side walls 15, in such manner that their delivery edges are no longer parallel, or substantially parallel, but, instead, are distinctly flared. This flaring is preferably accomplished by separation of the upper outer corners, thus warping the sides 15, 15, so that the thin flat stream of seed delivered from the apparatus is delivered from a surface which gives to the stream a lateral, or horizontal, extent, in which the seeds in the upper portion of the stream are laterally displaced relative to the seeds in the lower portion of the stream and, consequently, there will be a more even distribution of the seed over the ground as a result of reciprocation of the instrument. The side walls 15 are preferably corrugated, substantially as shown, but it will be understood that this is not absolutely essential.

In operation, the sower hangs the seed-filled sack 10 on his shoulder and swings the instrument back and forth as he walks across the field. The seed travels down through the hollow handle by gravity and centrifugal force and the air-catching funnels 16 cause streams of air to be carried across the discharge end of the handle 13, so as to distribute the seed over the opposite side wall 15 and assist in propelling the seed along these side walls alternately and discharging the same from the instrument.

I claim as my invention:

1. A broadcast sower, comprising a hollow head having upwardly and outwardly flared sides, whereby the head is materially wider at its top than at its bottom, said sides comprising a plurality of narrow vertically separated shelves, a delivery spout leading to the rear end of said hollow head, and wind funnels extended laterally at the base of the hollow head in front of the delivery spout.

2. A broadcast sower, comprising a hollow head having upwardly and outwardly flaring sides, whereby the head is materially wider at its top than at its bottom, a delivery spout leading to the rear end of said hollow head, and wind funnels extended laterally at the base of the hollow head in front of the delivery spout.

In witness whereof, I have hereunto set my hand at Indianapolis, Indiana, this twenty-second day of April, A. D. one thousand nine hundred and eighteen.

GEORGE A. WIRT.

Copies of this patent may be obtained for five cents each, by addressing the "Commissioner of Patents, Washington, D. C."